J. B. WELPTON.
Hame Tug Clips.
No. 5,376. Reissued April 22, 1873.
Fig. II
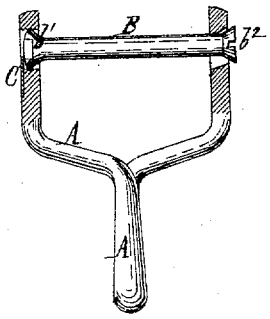
Fig. I.
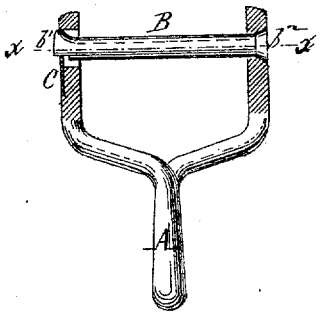
Fig. III
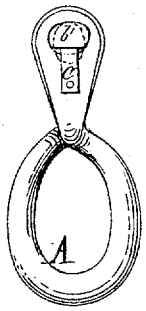
Fig. IV.
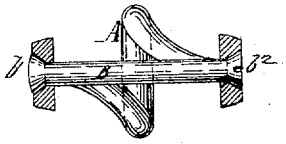
John J. Sonnet
Edward Wilhelm } Witnesses
John B. Welpton Inventor
by Jay Hyatt
Atty.

UNITED STATES PATENT OFFICE.

JOHN B. WELPTON, OF TABOR, IOWA

IMPROVEMENT IN HAME-TUG CLIPS.

Specification forming part of Letters Patent No. 125,237, dated April 2, 1872; reissue No. 5,376, dated April 22, 1873; application filed June 1, 1872.

*To all whom it may concern:*

Be it known that I, JOHN B. WELPTON, of Tabor, in the county of Fremont and State of Iowa, have invented certain new and useful Improvements in Hame-Tug Clips, of which the following is a specification:

My invention relates to the construction of a clip or eye such as are employed for the connection of the forward end of the tug of a harness to the staple of the hame. As usually constructed heretofore this eye has been provided with two extended flattened arms between which the end of the tug has been rigidly secured by riveting, so as to form, when connected to the hame, a non-detachable coupling. The object of my invention is the production of a tug clip or eye that can be readily detached from the tug and from the hame-staple when desired, for changing the hame or other purposes. The invention consists, first, of an eye or clip, in combination with a removable fastening-bolt, the body or loop of said clip being twisted so as to bring the loop at right angles to said bolt, which couples the ends of the eye to the tug after the manner of an ordinary cock-eye, so that by removing the fastening-bolt the eye is readily detached from the tug and engaged or disengaged from the hame-staple by passing one of the ends of my improved clip through the same, which the twisted and open form of the loop of the clip readily permits; second, the combination, with the tug-clip and fastening-bolt, of a locking-spring constructed to engage with the end of the bolt so as to hold the same in place, as hereinafter described.

In the accompanying drawing, Figure I is a sectional view of my improved tug-clip, showing the bolt locked in place. Fig. II is a similar view, showing the bolt partly removed. Fig. III is a side view of the clip; and Fig. IV, a cross-section on line *x x*, Fig. I.

Like letters designate like parts in each of the figures.

A is the body or loop of the clip, and B the bolt which passes through the flattened ends of the same so as to secure the clip to the short portion of the tug, commonly called the hame-tug. The loop A is twisted so as to bring it at right angles to the fastening-bolt B, and is formed open, as clearly shown in Fig. IV, so that upon removing said bolt the loop A can be readily slipped through the hame-staple while attached to the hame. As shown in the drawing, the bolt B is formed with two conical heads, $b^1$ $b^2$. The head $b^1$ is made oblong and provided with a shoulder or rabbet, as shown in Figs. I, II, and III, with which engages a small spring, C, attached to the flattened arm of the clip to prevent the fastening-bolt from turning. Both of the eyes or holes of the clip are made oblong, so that the head $b^1$ of the bolt may pass through them, the eye in which the head $b^1$ fits being made conical on two sides to retain the bolt B in place. The head $b^2$ of the latter is provided with a groove or notch to receive a screw-driver for turning the bolt in inserting and removing it.

In inserting the bolt B the head $b^1$ thereof is passed through the holes of the clip until it rests against the spring C, when a slight pressure and a one-quarter turn locks it in place.

To remove the bolt the end of a sharp-pointed instrument is inserted beneath the free end of the spring C and the latter slightly raised, while the bolt B is turned one-quarter around, whereby the head $b'$ thereof is passed beneath the spring C and the bolt readily withdrawn.

The bolt B may, however, be secured in place in any other common and well-known manner, so as to permit of its ready insertion and removal.

I claim as my invention—

1. A tug-clip, consisting of a twisted body or open loop and a removable coupling-bolt, as a new article of manufacture, substantially as hereinbefore set forth.

2. The combination, with a tug-clip, of the coupling-bolt B $b^1$ $b^2$ and spring C, constructed as hereinbefore shown and described.

JOHN B. WELPTON.

Witnesses:
JAY HYATT,
JOHN J. BONNER.